United States Patent [19]

Carlson et al.

[11] Patent Number: 5,513,543
[45] Date of Patent: May 7, 1996

[54] ADJUSTABLE CONTROL LEVER WITH VARIABLE PRESSURE DETENT

[75] Inventors: Richard Carlson, Wilmette; David Treadwell, Crystal Lake, both of Ill.

[73] Assignee: MPC Products, Skokie, Ill.

[21] Appl. No.: 38,127

[22] Filed: Mar. 26, 1993

[51] Int. Cl.⁶ .............................. G05G 5/06; F16H 1/16
[52] U.S. Cl. ..................... 74/527; 74/425; 74/89.14; 464/39
[58] Field of Search ........................ 74/606 R, 425, 74/83.14, 10.85, 7 D, 724, 426, 427; 464/39, 46

[56] References Cited

U.S. PATENT DOCUMENTS

| | | | |
|---|---|---|---|
| 4,503,899 | 3/1985 | Forquer | 74/425 |
| 4,541,294 | 9/1985 | Byers | 74/89.14 |
| 4,542,814 | 9/1985 | Ledeen et al. | 74/425 X |
| 4,616,803 | 10/1986 | Schils | 74/527 X |
| 4,693,132 | 9/1987 | Buxton et al. | 464/39 X |
| 4,813,303 | 3/1989 | Beezer et al. | 74/425 |
| 4,979,603 | 12/1990 | Wheatland | 74/425 X |

OTHER PUBLICATIONS

A Complete Guide to Selecting High–Torque Hydraulic Clutches, AUSCO Catalog, pp. 1 and 2 (Prior to Jul. 1985).

Primary Examiner—Vinh T. Luong
Attorney, Agent, or Firm—Laff, Whitesel, Conte & Saret, Ltd.

[57] ABSTRACT

A detent assembly and control lever assembly in which the tactile resistance to movement at the detent, and in the overall movement of the control arm, are concurrently increased or decreased. The apparatus, in one embodiment, includes a control lever arm assembly, a variable resistance detent assembly, and a control lever friction assembly whose movement is linked to that of the detent assembly.

6 Claims, 3 Drawing Sheets

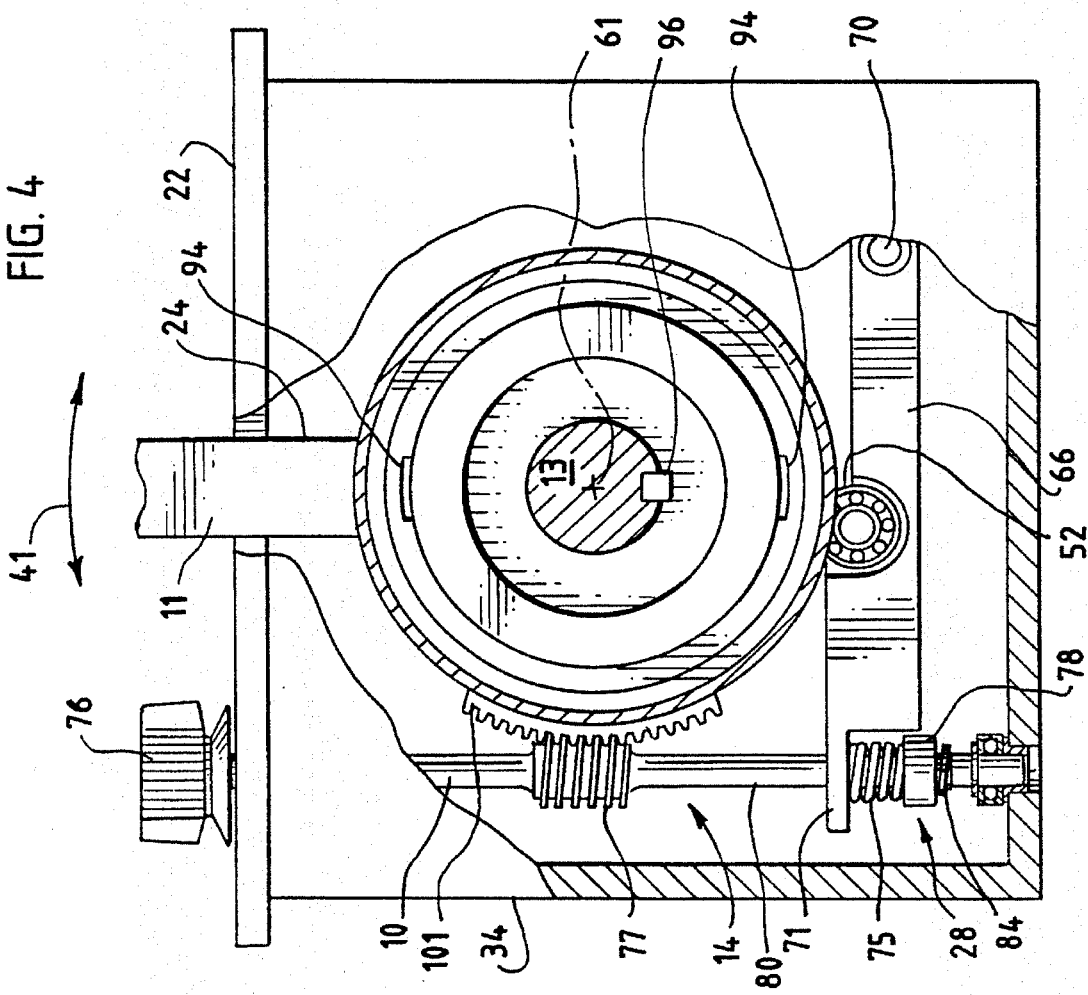
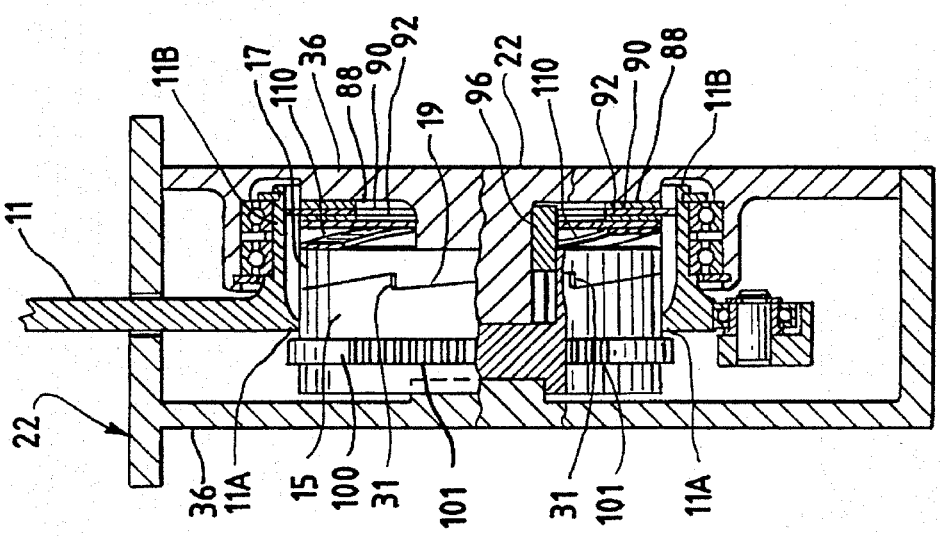

ADJUSTABLE CONTROL LEVER WITH VARIABLE PRESSURE DETENT

FIELD OF THE INVENTION

This invention relates generally to control levers. More particularly, this invention relates to control levers with adjustable damping or resistance to movement in which overshoot in the operation of a control lever is minimized or prevented.

BACKGROUND OF THE INVENTION

Air flight control levers, such as those used to control the throttle, the flaps or the speed brake of an airplane, include different tactile resistance mechanisms which assist a pilot in operating the control levers. These mechanisms are designed to place resistance on the control levers which provides the pilots with greater control over the airplane.

One type of mechanism places a constant resistance upon the control lever which is felt over the entire "throw" of the lever. This resistance is to insure that a certain amount of force is required to move the control lever, while allowing the pilot to "feel" the lever as it moves within its housing. Another type of resistance mechanism used with control levers is a detent. A detent places a greater amount of resistance upon the control lever at a specific point, and is used to tactually signal the pilot before the control lever passes through a cross-over point. For example, in jet fighters, there is a detent in the throttle mechanism to let the pilot know, as the throttle is advanced, that a point is reached, past which the afterburners "kick in", causing the jet to rapidly increase speed.

The differences in pilots' flying styles and techniques require that the resistance placed upon the control lever be adjustable to meet the desires of each individual pilot. In current control levers, however, the detents typically are not adjustable. Thus, when the resistance or "feel friction" of the control lever is adjusted to a low level, the resistance on the detent remains unchanged at a high level. The pilot must exert extra force to move the lever over the detent, creating a serious danger that "overshoot" will occur. For example, if the pilot must apply eight pounds of pressure to pass the detent, but encounters only two pounds of resistance from the "feel friction" on the lever beyond the detent, the pilot is likely to overshoot the detent point as the lever is moved past the eight pound resistance of the detent.

In the case of a jet fighter throttle, overshoot could result in unwanted and unexpected increases in speed. Overshoot may similarly occur in brake and flap controls which incorporate detents to alert the pilot of pivotal cross-over points. Thus, as in the case of the throttle control, if the "feel friction" on the lever is adjusted to a low level of resistance, overshoot can occur which may cause a plane to lose air speed excessively.

While many currently available flight controls include as standard equipment mechanisms which allow the "feel friction" to be adjusted, these controls fail to provide an adjustable detent mechanism and fail to address the problems and dangers associated with "overshoot," as discussed above.

Accordingly, an object of the present invention is to provide an adjustable tactile resistance detent mechanism which minimizes or eliminates the danger of overshoot.

Another object of the present invention is to provide an adjustable tactile resistance detent mechanism which varies in proportion to the adjustable feel friction in the air flight control levers.

These and other objects and advantages of the invention will become apparent from the following description and drawings.

SUMMARY OF THE INVENTION

The present invention accomplishes the foregoing objects by providing a detent assembly and control lever assembly in which the tactile resistance to movement at the detent, and to overall movement of the control arm, are simultaneously increased or decreased. The apparatus includes a control lever arm assembly, a variable resistance detent assembly, and a control lever friction assembly whose movement is linked to the detent assembly. Thus, as the "feel friction" of the control lever friction assembly is adjusted, the resistance upon the detent is simultaneously adjusted as well. This concurrently variable resistance in both the detent and the control lever arm minimizes or eliminates the "overshoot" which occurs when too much force is exerted on a control lever as it passes through a detent point, as discussed above.

BRIEF DESCRIPTION OF THE DRAWINGS

The above, as well as other objects and advantages of the invention, will become apparent from the following detailed description in which reference is made to the accompanying drawings:

FIG. 3 is a cut-away view of the preferred embodiment of FIG. 2 of the invention, taken along line 3—3; and FIG. 4 is a side elevation view of the other side of the invention shown in FIG. 2.

DETAILED DESCRIPTION OF THE INVENTION

Figure 1:
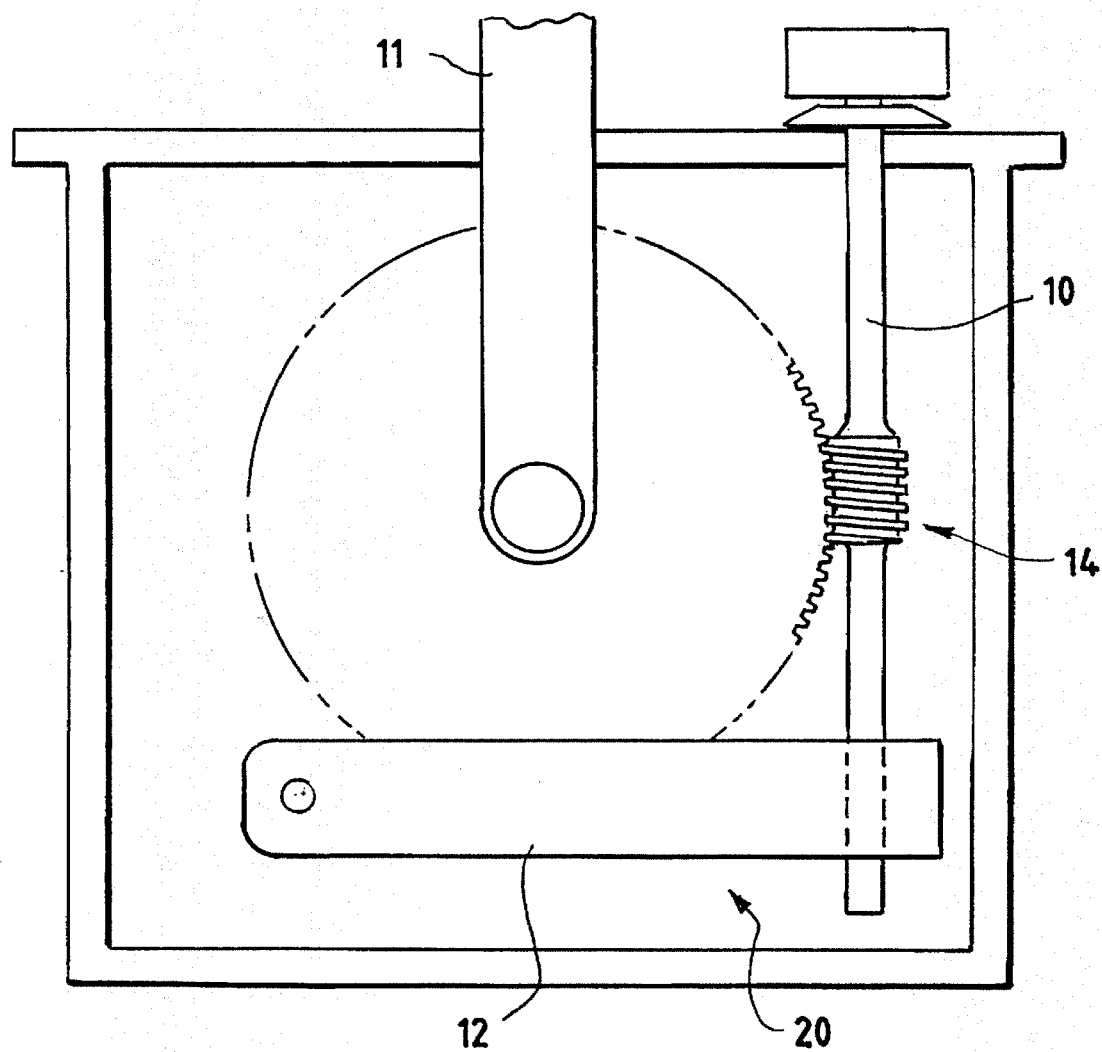
FIG. 1 is a schematic representation of the present invention.

FIG. 1 illustrates in schematic form an apparatus in accordance with one embodiment of the invention. The apparatus generally comprises a pressure adjustment means 10 for controlling the friction within a control lever 11, in the form of a control lever friction assembly 14, and a variable pressure detent assembly 12, linked to the pressure adjustment means 10, for adjusting the tactile resistance of the control lever concurrently with the adjustment of the detent pressure.

Figure 2:
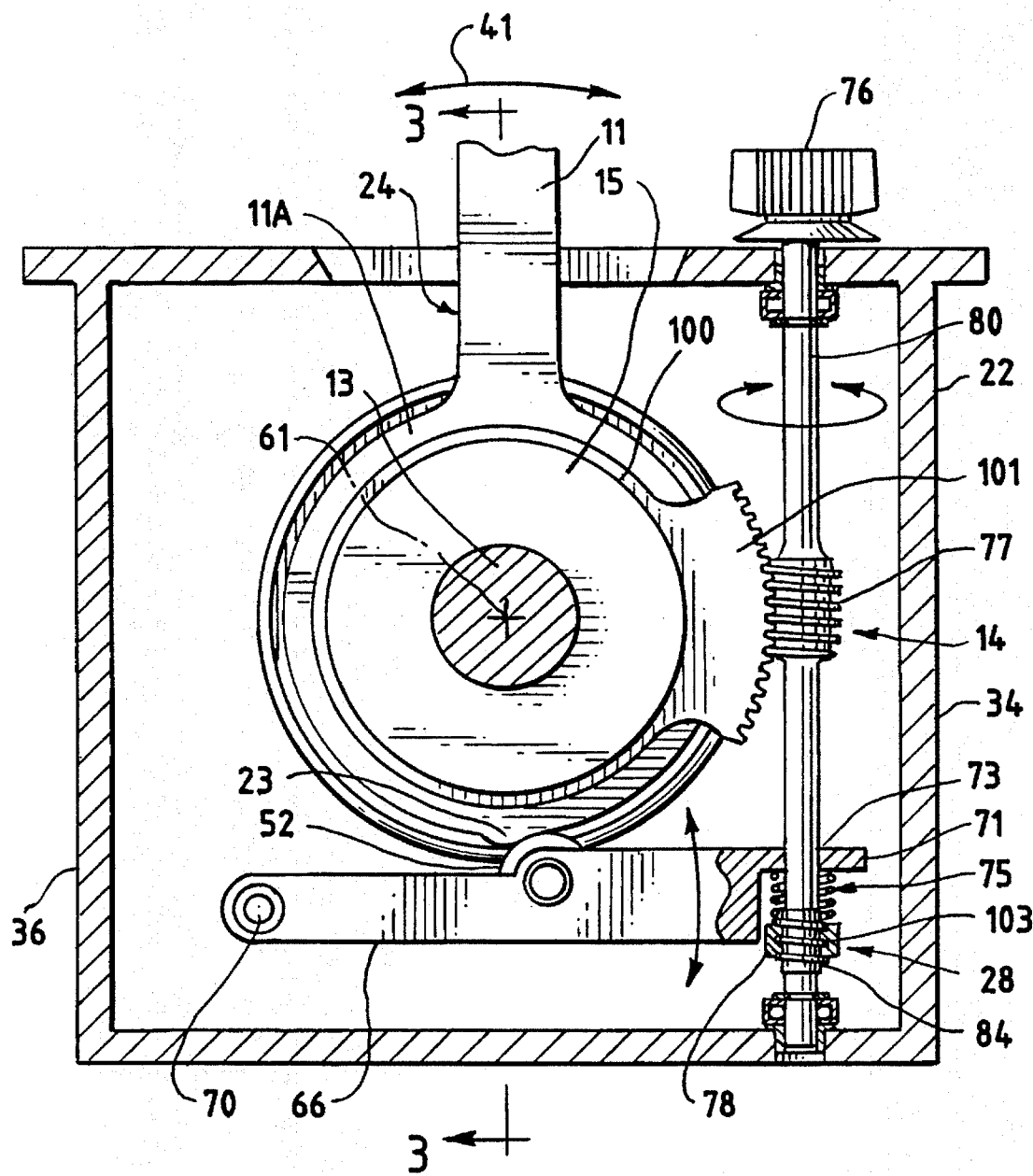
FIG. 2 is a side elevation cross-section view of a more-detailed embodiment of the invention.

In accordance with the more detailed embodiment of the invention shown in FIGS. 2–4, the apparatus comprises a main housing 22 which contains the variable pressure detent assembly 12, the control lever friction assembly 14, a control lever arm assembly 24, and a friction/detent adjustment assembly 28. The main housing 22 comprises a front cover 32, and a rear cover 34 for mounting the apparatus 20. Threaded members (not shown) containing input/output connectors may be connected to the main housing 22.

The control lever assembly comprises a non-rotating axle 13 having a generally cylindrical portion 15 rotatably mounted thereto and a plate 17 rigidly mounted thereto. A plurality of complimentary ramped mating surfaces 19 are formed along the adjacent sides of the "rotatable" portion or control lever plate 15 and the "non-rotatable" plate 17, and also define a plurality of detent points 31.

As shown in FIGS. 2 and 3, control lever 11 is rotatably mounted to the axle 13 by a ring or pad 11A, which is connected to a pair of arms 11B or upstanding annular portion of the ring 11A interconnecting the rings. Ring 11A is rotatably mounted to the rotatable portion 15 to enable the control lever 11 to rotate relative to rotatable portion 15. Additionally, a tooth 23 is formed in the ring 11A near its base. A circular plate 100, having a first segment gear 101 extending from a portion of its periphery, is also mounted to the rotatable portion 15.

The control lever arm assembly 24 preferably is vertically mounted within main housing 22, so that the control lever 11 extends parallel to side frames 36. The top of the control lever 11 extends above the main housing 22, and the entire control arm assembly is mounted to axle 13 to enable the control lever 11 to pivot about pivot point 61 in the directions of arrow 41 (FIG. 2 and 4).

As shown best in FIGS. 2 and 4, a detent arm 66 is pivotally connected at one end to the main housing 22 by way of a pivot pin 70, and includes a relatively thin plate 71 extending from its other end. Detent arm 66 is positioned horizontally across the lower portion of main housing 22, and a detent wheel 52 rests atop the detent arm near tooth 23 of ring 11A. As the ring 11A rotates above detent arm 66, tactile resistance is produced between the detent wheel 52 and detent arm 66. This tactile resistance, which may be increased or decreased (as will be explained below), allows different pilots to adjust the control levers to suit their specific styles.

The friction/detent adjustment assembly 28 includes friction control knob 76, detent force adjustment plate 78, and a friction/detent adjustment shaft 80. The adjustment shaft 80 extends through an aperture 73 formed in the thin plate 71, an adjustment plate 78 and a spring 75, which separates the thin plate from the adjustment plate. The adjustment shaft includes a first worm gear 77, which engages first segment gear 101 extending from plate 100, and a second worm gear 84, which engages a threaded segment 103 formed within adjustment plate 78.

As a result of this construction, detent arm 66 is spring loaded, being pushed against detent wheel 52 by spring 75. Pivot pin 70 and spring 75 allow the detent arm to pivot vertically, relative to the positioning of detent force adjustment plate 78, while simultaneously keeping pressure on the detent wheel 52. Preferably, the friction/detent adjustment assembly 28 is vertically mounted at the rear of main housing 22, near rear cover 34.

The control lever friction assembly 14 includes a friction spring 110, at least one rotating friction plate 88 and at least one non-rotating friction plate 90. A plastic ring 92 is located between each of the rotating and non-rotating friction plates. The rotating friction plate 88 is attached to a first keyway 94 formed underneath each arm 11B, so that the rotating friction plate rotates with the arm 11B as the control lever 11 is moved. The non-rotating friction plate 90 is mounted to a second keyway 96 formed on the axle 13, which prevents the non-rotating friction plate from rotating. The non-rotatable plate 17 may also be mounted to the second keyway 96. The first and second keyways preferably are generally rectangular.

As best seen in FIGS. 2 and 4, the friction spring 110 is in direct contact with the non-rotating friction plate 90, and the non-rotatable plate 17 at a location opposite the rotatable portion 15.

Accordingly, the invention can be operated as follows: To adjust the resistance within the control lever friction assembly 14, the operator turns the friction control knob 76, which rotates the adjustment shaft 80 and worm gear 77. The rotation of worm gear 77 causes the first segment gear 101 and rotatable portion 15 to rotate. As a result, the mating ramped surfaces 19 force the non-rotating plate to compress friction spring 110. As spring 110 is compressed, it increases the normal force on the rotating and non-rotating friction plates 88, 90, causing an increase in friction. Because of this increase in friction, increased manual force is required to move control lever 11. Accordingly, the friction plates 88, 90 reduce or increase the "feel friction" of the control lever arm assembly 24 to help eliminate overshoot as the lever 11 passes the detent point 31.

The turning of the frictional control lever 76 also causes rotation of worm wheel 84, which in turn lifts adjustment plate 78. As the adjustment plate 78 is elevated, spring 75 is compressed, causing a higher preload in the spring. As a result, more force is required to deflect arm 66 and rotate tooth 23 over the detent wheel 52. Thus, as the control lever 76 is adjusted, the tactile resistance between the detent arm 66 and the detent wheel 52 is increased. To overcome the increased resistance, the operator must exert a greater force upon the control lever arm 11 to move the wheel 52 along the detent arm 66 and past the detent points.

Thus, the user rotates the friction/detent adjustment assembly 28 to simultaneously and proportionally increase or decrease the "feel friction" of the control lever friction assembly 14, and the resistance of the variable pressure detent assembly 12. Once the overall tactile resistance is adjusted to the proper level, the pilot moves control lever arm 11 as desired. As the pilot "throws" the control lever past the detent point by exerting an additional force upon the control lever arm 11, the resistance placed upon the control lever arm 11 rapidly decreases. This lack of resistance is compensated for, however, by the increased resistance presented by the control lever friction assembly 14, thereby minimizing or preventing overshoot.

Rotation of friction control knob 76, of course, in the opposite direction reduces the forces described above.

While the invention has been described in relation to a preferred embodiment thereof, those skilled in the art may develop a wide variation of structural details without departing from the principles of the invention. Accordingly, the appended claims are to be construed to cover all equivalents falling within the scope and spirit of the invention.

The invention claimed is:

1. An improved control apparatus comprising:

a movable control lever having a variable pressure detent mechanism;

means, linked to said variable pressure detent mechanism, for adjusting the tactile resistance of said control lever concurrently with the adjustment of the detent pressure;

said means for adjusting the tactile resistance including a control lever plate, a pad which moves with movement of the control lever, and brake means for increasing and decreasing the resistance of the brake means;

said brake means comprising a friction plate, a non-rotatable plate interconnected with said control lever plate, a spring interconnecting said friction plate and said non-rotatable plate for applying pressure to said friction plate, and a worm gear engaged with the control lever plate;

said worm gear operating to increase and decrease the pressure between, in turn, said control lever plate, said non-rotatable plate, said spring, and said friction plate concurrently with the adjustment of said detent mechanism.

2. The apparatus of claim 1 wherein a plurality of complimentary mating ramped surfaces engage the non-rotatable plate and control lever plate, said complimentary mating ramped surfaces operating with the worm gear to increase the pressure between the non-rotatable plate and control lever plate.

3. An improved control apparatus comprising:

a movable control lever having a variable pressure detent mechanism;

means, linked to said variable pressure detent mechanism, for adjusting the tactile resistance of said control lever concurrently with the adjustment of the detent pressure;

said means for adjusting the tactile resistance including a control lever plate, a pad which moves with movement of the control lever, and brake means for increasing and decreasing the resistance of the brake means;

said variable pressure detent mechanism comprising a detent arm having a detent wheel, said detent wheel being in contact with said control lever plate, and a worm gear operating to increase and decrease the resistance between said detent wheel and said control lever plate.

4. The apparatus of claim 3 wherein the variable pressure detent mechanism further comprises a movable adjustment plate engaged with said worm gear, and a spring interconnecting and applying pressure to said friction adjustment plate and said detent arm.

5. The apparatus of claim 4 wherein said detent arm includes a thin plate extending from one end of said detent arm, said thin plate being in contact with said spring.

6. An improved control apparatus comprising:

a movable control lever having a variable pressure detent mechanism;

a control lever plate;

a movable plate;

a first worm gear which operates to increase and decrease the pressure between said control lever plate and said movable plate concurrently with the adjustment of said detent mechanism; and a second worm gear which operates to increase and decrease the pressure applied by said variable pressure detent mechanism.

* * * * *